United States Patent
Bates et al.

(10) Patent No.: US 7,506,313 B2
(45) Date of Patent: Mar. 17, 2009

(54) DEBUG OF CODE WITH SELECTIVE DISPLAY OF DATA

(75) Inventors: Cary Lee Bates, Rochester, MN (US); John Matthew Santosuosso, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1341 days.

(21) Appl. No.: 10/090,341

(22) Filed: Mar. 4, 2002

(65) Prior Publication Data

US 2003/0167459 A1    Sep. 4, 2003

(51) Int. Cl.
   *G06F 9/44* (2006.01)
(52) U.S. Cl. ................................ 717/125; 717/129
(58) Field of Classification Search ......... 717/124–131, 717/172–178, 103, 169; 714/38; 712/227; 716/4; 705/1, 14; 709/203–223, 24; 711/1; 726/8; 713/193; 707/9, 10
   See application file for complete search history.

(56) References Cited

U.S. PATENT DOCUMENTS

| 5,812,850 | A | * | 9/1998 | Wimble | 717/131 |
| 6,026,362 | A | * | 2/2000 | Kim et al. | 705/1 |
| 6,085,029 | A | * | 7/2000 | Kolawa et al. | 714/38 |
| 6,219,782 | B1 | * | 4/2001 | Khan et al. | 712/227 |
| 6,412,106 | B1 | * | 6/2002 | Leask et al. | 717/124 |
| 6,578,199 | B1 | * | 6/2003 | Tsou et al. | 717/178 |
| 6,606,744 | B1 | * | 8/2003 | Mikurak | 717/174 |
| 6,611,924 | B1 | * | 8/2003 | Warmink et al. | 714/38 |
| 6,618,839 | B1 | * | 9/2003 | Beardslee et al. | 716/4 |
| 6,631,519 | B1 | * | 10/2003 | Nicholson et al. | 717/169 |
| 6,839,894 | B1 | * | 1/2005 | Joshi et al. | 717/130 |
| 7,051,212 | B2 | * | 5/2006 | Ginter et al. | 713/193 |
| 7,062,750 | B2 | * | 6/2006 | Whidby et al. | 717/103 |
| 2002/0066094 | A1 | * | 5/2002 | Futakuchi | 717/172 |
| 2002/0095543 | A1 | * | 7/2002 | Shioda et al. | 711/1 |
| 2002/0161833 | A1 | * | 10/2002 | Niven et al. | 709/203 |
| 2003/0023703 | A1 | * | 1/2003 | Hayward et al. | 709/217 |
| 2003/0051026 | A1 | * | 3/2003 | Carter et al. | 709/224 |
| 2003/0208747 | A1 | * | 11/2003 | Kim et al. | 717/131 |
| 2003/0233278 | A1 | * | 12/2003 | Marshall | 705/14 |
| 2004/0031030 | A1 | * | 2/2004 | Kidder et al. | 717/172 |
| 2004/0205720 | A1 | * | 10/2004 | Hundt | 717/124 |
| 2005/0044191 | A1 | * | 2/2005 | Kamada et al. | 709/223 |
| 2007/0044144 | A1 | * | 2/2007 | Knouse et al. | 726/8 |

* cited by examiner

*Primary Examiner*—Lewis A. Bullock, Jr.
*Assistant Examiner*—Thuy Dao
(74) *Attorney, Agent, or Firm*—Patterson & Sheridan, LLP

(57) ABSTRACT

Method, article of manufacture and apparatus for selectively displaying data during debugging. One embodiment provides a method of debugging code having associated data in a repository. The method comprises initiating a debugging session for the code; accessing the associated data in the repository during the debugging session; and determining whether the associated data can be displayed during the debugging session.

17 Claims, 5 Drawing Sheets

*Fig. 2*
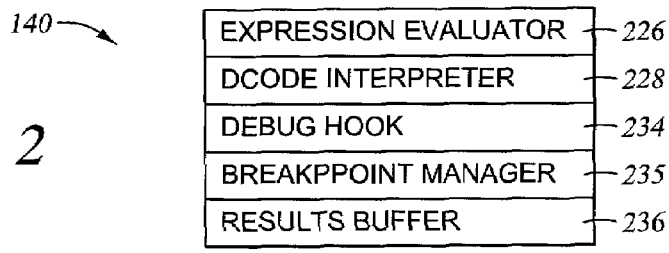
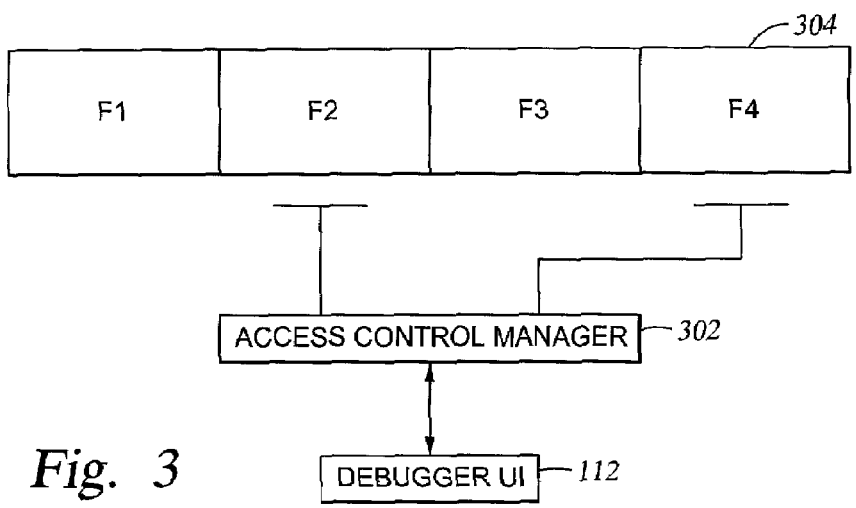
*Fig. 3*
| TYPE | FIELD | ASSOCIATED FIELDS | PARSE EXP | OUTPUT EXP |
|---|---|---|---|---|
| ABSOLUTE | FIELD2 | | | |
| COND | FIELD3 | FIELD1 | | |
| COND | FIELD1 | FIELD3 | | |
| ABSOLUTE | FIELD6 | | $1:$2 | $1* |
*Fig. 4*

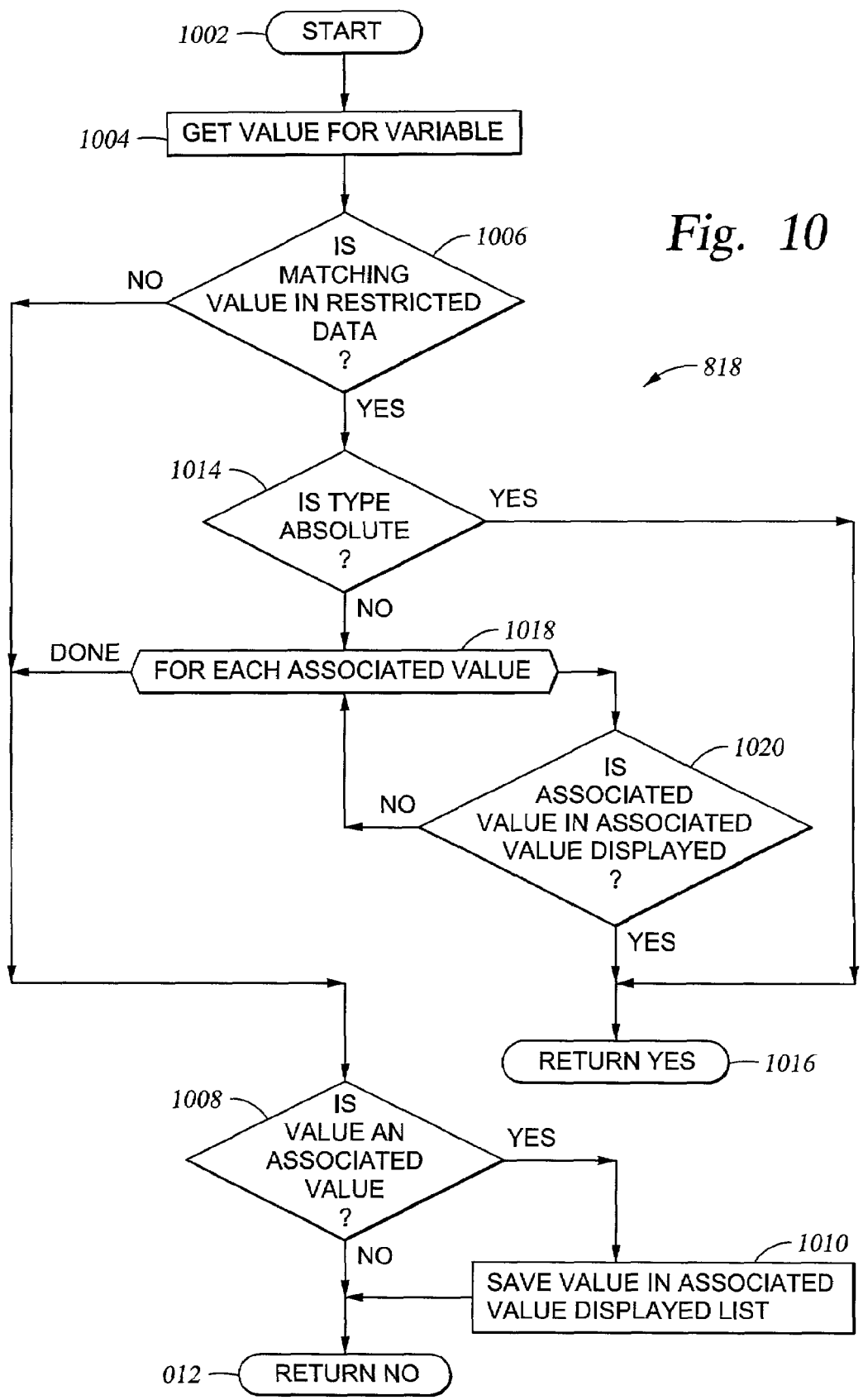

DEBUG OF CODE WITH SELECTIVE DISPLAY OF DATA

BACKGROUND OF THE INVENTION

1. Field of the Invention

The present invention generally relates to data processing. More particularly, the invention relates to debugging code.

2. Description of the Related Art

A programmer develops a software program by producing and entering source code into files using a text editor program. The computer then creates an executable program by translating the source code into machine code. The machine code is the rudimentary instructions understood by a computer. Illustratively, the foregoing software development process is accomplished by running a series of programs. These programs typically include a compiler for translating the source code into machine code and a linker to link the machine code together to form a program.

When developing computer software, it is necessary to perform a function termed "debugging". Debugging involves testing and evaluating the software to find and correct any errors and improper logic operation. An effective debugger program is necessary for rapid and efficient development of software.

A conventional debugging system comprises a combination of computer hardware and debugger software that executes a user's program in a controlled manner. Debugging aids a user in identifying and correcting mistakes in an authored program by allowing the program to be executed in small segments. To this end, debugging provides functions including breakpoints, run-to-cursor, step into, step over and the like.

Debugging is often necessary not only during initial development, but post-development when the code is being used by end-users. This may occur, for example, because the code was not fully tested by the developer or because end-users initialize the code in a manner not contemplated by the developer. Post-development bugs may be discovered by the developer or by the end-users. In any case, the developer is now required to perform additional debugging. Typically, the developer retains the source code to be debugged and provides end-users only with a debuggable copy of the object code. Accordingly, when a post-development bug is encountered, the developer may remotely connect to an end-user's system (e.g., via a workstation on which the source code resides) and debug the end-user's application at the source level without ever revealing the source code to the end-user. In other cases, the end-user may be provided with the source code. In such a case, the developer accesses the source code locally at the end-user's site.

Developers typically prefer the former approach, in which the source code is never revealed to the end-user, because the developer is able to retain a proprietary interest in the source code. However, neither approach protects any confidential information the end-user may have on the system being debugged. Specifically, by allowing the developer access to their application to be debugged (whether remotely or locally), the end-user exposes their confidential information associated with the application.

Therefore, there is a need for a method and system of debugging code without compromising confidential data.

SUMMARY OF THE INVENTION

The present invention generally provides method, articles of manufacture and apparatus for selectively displaying data during debugging. One embodiment provides a method of debugging code having associated data in a repository. The method comprises initiating a debugging session for the code; accessing the associated data in the repository during the debugging session; and determining whether the associated data can be displayed during the debugging session. In one embodiment determining whether the associated data can be displayed comprises determining whether the associated data can be provided to a debugger user interface.

Another embodiment comprises a computer-readable medium containing a debug program which, when executed, performs an operation during debugging code having associated data in a repository. The operation comprises accessing the associated data in the repository; and determining whether the associated data can be displayed.

Another embodiment comprises a computer-readable medium containing a debug program which, when executed, performs an operation of debugging code having associated data in a repository. The debug program comprises a debugger user interface; and a debug engine configured to selectively pass data to the debugger user interface according to predefined access restriction rules defining at least one rule preventing at least a portion of the associated data from being displayed to a user.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 2 is an embodiment of a debug engine.

FIG. 3 illustrates the operation of one embodiment of an access control manager, whereby the ability of a debugger user interface to display a record is limited.

FIG. 4 is one embodiment of access rules which are implemented to conceal selected information from a user debugging code.

FIG. 10 illustrates one embodiment of determining whether data is restricted.

DETAILED DESCRIPTION OF THE PREFERRED EMBODIMENTS

Figure 1:
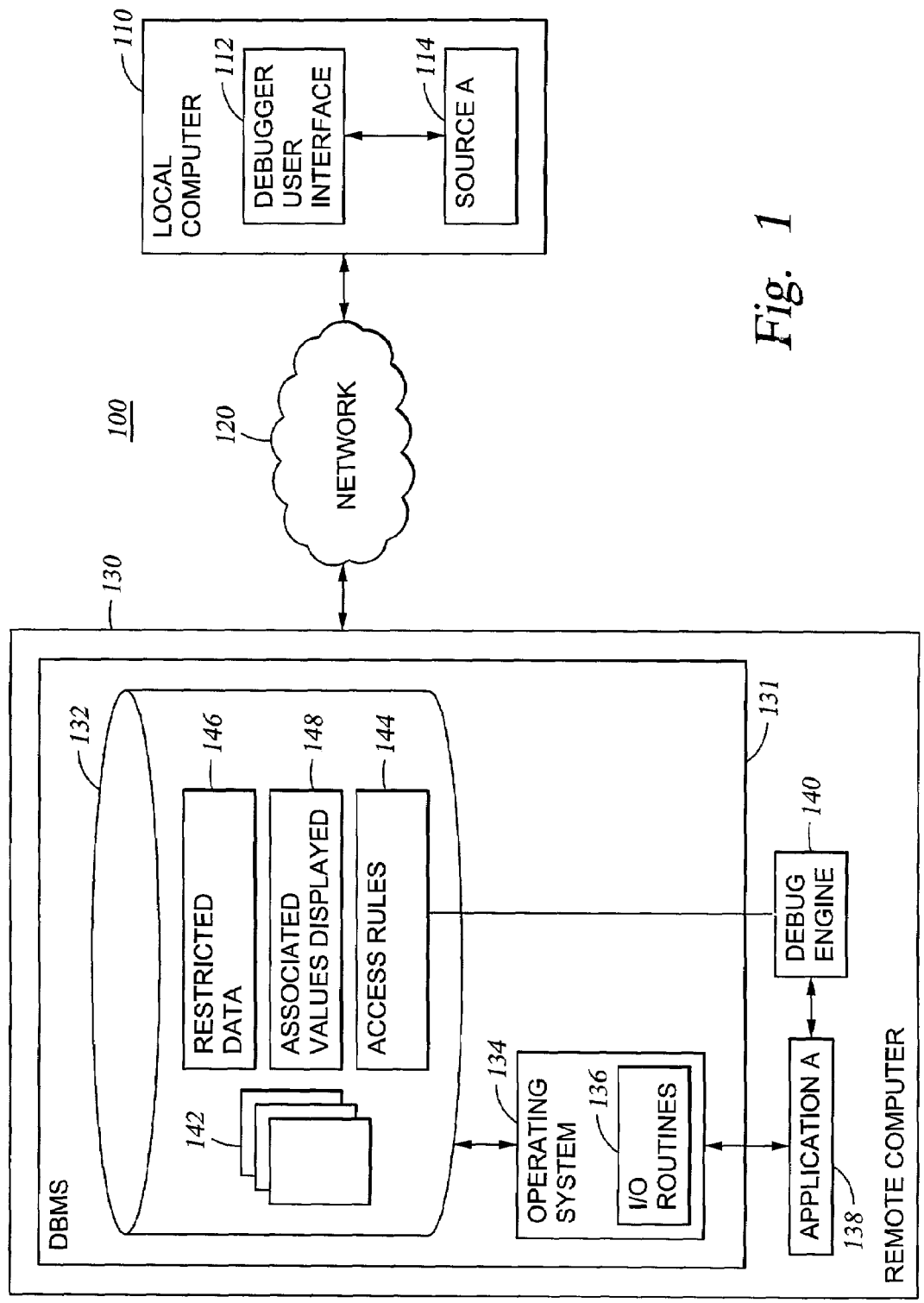
FIG. 1 is one embodiment of a network environment comprising a local computer system connected to a remote computer system via a network.

Embodiments of the present invention provide methods, systems and articles of manufacture for defining a secure database interface which implements debug rules for accessing a database. In general, one or more fields of records in a database may be restricted from view by a user during a debug session.

One embodiment of the invention is implemented as a program product for use with a computer system. The program(s) of the program product defines functions of the embodiments (including the methods described below) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Illustratively, embodiments of the invention are shown practiced in a distributed computing environment in which tasks are performed by a remote processing device(s) that are linked to a local system through a communications network. In a distributed computing environment, program modules may be located in both local and remote memory storage devices. In this regard, the local system may be considered a thin client which performs little or no processing. However, embodiments of the invention are not limited to distributed computing environment and it is contemplated that any or all methods disclosed herein may be performed locally on a single system.

FIG. 1 is one embodiment of a network environment 100 comprising a local computer system 110 connected to a remote computer system 130 via a network 120. In general, computer systems 110 and 130 may represent, or include, any type of computer, computer system or other programmable electronic device, including a client computer, a server computer, a portable computer, an embedded controller, a desktop or PC-based computer, a workstation, a network terminal, etc. Moreover, those skilled in the art will appreciate that embodiments may be practiced with other computer system configurations including hand-held devices, multiprocessor systems, microprocessor-based or programmable consumer electronics, minicomputers, mainframe computers and the like. In a particular embodiment, one or both of the computer systems is an eServer iSeries 400 computer available from International Business Machines, Corporation of Armonk, N.Y.

In general, the computer systems 110 and 130 may comprise at least one processor which obtains instructions and data from a main memory. The computer systems may comprise other well-known components such as storage, interface devices and the like. In addition, the computer systems could include a number of operators and peripheral systems including a direct access storage device, a display, and networked devices.

The computer systems 110 and 130 facilitate debugging of code. Illustratively, source code 114 to be debugged (represented as "Source A") resides on the local computer 110 and corresponding debuggable object code 138 (illustratively represented as "application A") resides on the remote computer 130. The object code 138 is configured to access (i.e., read from or write to) data 142 contained in a database 132. The database 132 may be any known or unknown database including, for example, DB2, Oracle, Sybase, etc. The term "database" is used herein merely for convenience and, more generally, refers to any data repository. In one embodiment, the object code 138 accesses the database 132 by invoking I/O routines 136. Illustratively, the I/O routines 136 are part of an operating system 134. Further, although the database 132 is shown separately from the operating system 134, in other embodiments, the database 132 is a part of the operating system 134. Debugging the source code 114/object code 138 is facilitated by a debugger comprising a debugger user interface 112 and a debug engine 140. In one embodiment, the database 132 and the operating system 134 are part of a database management system 131.

Illustratively, the debugger user interface 112 resides on the local computer 110 while the debug engine 140 resides on the remote computer 130. However, as described above, the invention is not limited to distributed environments and may be implemented locally.

A particular embodiment of the debug engine 140 is shown in FIG. 2. Illustratively, the debug engine 140 comprises an expression evaluator 226, Dcode interpreter 228 (also referred to herein as the debug interpreter 228), debugger hook (also known as a stop handler) 234, a breakpoint manager 235 and a results buffer 236. Although treated herein as integral parts of the debugger 223, one or more of the foregoing components may exist separately in the computer system 130. Further, the debugger may include additional components not shown.

A debugging process is initiated by the debug user interface 112 from the local computer 110. The user interface 112 presents the program under debugging (e.g., source code 114 and object code 138) and highlights the current line of the program on which a stop or error occurs. The user interface 112 allows the user to set control points (e.g., breakpoints and watch points), display and change variable values, and activate other inventive features described herein by inputting the appropriate commands. In some instances, the user may define the commands by referring to high-order language (HOL) references such as line or statement numbers or software object references such as a program or module name, from which the physical memory address may be cross referenced.

The expression evaluator 226 parses the debugger command passed from the user interface 112 and uses a data structure (e.g., a table) generated by a compiler to map the line number in the debugger command to the physical memory address in memory 216. In addition, the expression evaluator 226 generates a Dcode program for the command. The Dcode program is machine executable language that emulates the commands. Some embodiments of the invention include Dcodes which, when executed, activate control features described in more detail below.

The Dcode generated by the expression evaluator 226 is executed by the Dcode interpreter 228. The interpreter 228 handles expressions and Dcode instructions to perform various debugging steps. Results from Dcode interpreter 228 are returned to the user interface 112 through the expression evaluator 226. In addition, the Dcode interpreter 228 passes on information to the debug hook 234, which takes steps described below.

After the commands are entered, the user provides an input that resumes execution of the program 220. During execution, control is returned to the debugger 223 via the debug hook 234. The debug hook 234 is a code segment that returns control to the appropriate user interface. In some implementations, execution of the program eventually results in an event causing a trap to fire (e.g., a breakpoint or watchpoint is encountered). Inserting and managing special op codes that cause these traps to fire is the responsibility of the breakpoint manager 235. When a trap fires, control is then returned to the debugger by the debug hook 234 and program execution is halted. The debug hook 234 then invokes the debug user interface 112 and may pass the results to the user interface 112. Alternatively, the results may be passed to the results buffer 236 to cache data for the user interface 112. In other embodiments, the user may input a command while the program is stopped, causing the debugger to run a desired debugging routine. Result values are then provided to the user via the user interface 112.

In one embodiment, the debug engine 140 and access rules 144 define an "access control manager" which conceals selected information from a user debugging the source code 114 and object code 138. FIG. 3 illustrates the operation of one embodiment of such an access control manager 302, whereby the ability of the debugger user interface 112 to display a record 304 is limited. Illustratively, the rules of the access control manager 304 allow only the second field (F2) and the fourth field (F4) of the record 304 to be displayed to an end user via the debugger user interface 112. Accordingly, the predefined rules of the access control manager 304 conceal the values of the first field (F1) and the third field (F3).

FIG. 4 shows one embodiment of the access rules 144. In general, the access rules 144 are organized as a table containing a plurality of columns and rows, where each row defines a record. Illustrative columns include a Type column 402, a Field column 404, an Associated Fields column 406, a Parse Expression column 408 and an Output Expression column 410. The Type column 402 contains a restriction type value. Illustrative restriction type values include "absolute" and "conditional". Absolute restriction type values indicate that a specified field is to be unconditionally concealed (i.e., not displayed). In contrast, conditional restriction type values allow users to specify conditions which, when satisfied, prevent a specified field from being displayed. For example, the second record of the access rules 144 specifies that when Field3 has been displayed, Field1 will not be displayed. In this manner, the values of Field3 and Field1 cannot be viewed simultaneously. In one embodiment, such conditional rules are implemented symmetrically, as illustrated by the third field of the access rules 144.

In some cases, it may be desirable to reveal only portions of data having a specified format. To this end, the access rules 144 include the parse expression column 408 and the output expression column 410. The value in the parse expression column 408 describes a format to be identified during debugging. The value in the output expression column 410 describes data to be concealed (i.e., not displayed) according to some portion of the parse expression format. For example, an illustrative parse expression defines a format "$1:$2" and the corresponding output expression specifies "$1*", where the asterisk (*) is a wild-card character. In this case, field values containing the root value corresponding to a "$1" will not be displayed. Of course, it is contemplated that the value of the output expression column 410 may instead describe the portion of the data to be displayed. Further, in another embodiment, only the value corresponding to the output expression (e.g., "$1") is concealed, while the remaining portion of the parse expression (e.g., ":$2") is displayed.

Some aspects of the invention may be further described with reference to FIG. 5, which is a sample record 500 from the data 142. In particular, the sample record 500 shows illustrative values for Field1, Field2, Field3, and Field6 of the access rules 144 shown in FIG. 4. Field6 is shown having the value "JONES:8762596". According to the parse expression "$1:$2" shown in FIG. 4, JONES is expressed by "$1" and "8762596" is expressed by "$2". Accordingly, applying the output expression "$1*" results in concealing any instance of data having the root "JONES". Thus, the value "JONES:8762596" will not be displayed. In an alternative embodiment, any data described by the expression $2 will be displayed. Thus, the value "JONES:8762596" would be displayed as, for example, "*****:8762596".

In one embodiment, data structures are created during a debugging session to track restricted data. Such data structures may include, for example, a Restricted Data Table 146 and an Associated Values Displayed Table 148, both of which are shown stored in the database 132 of FIG. 1. Illustrative representations of such data structures are shown in FIGS. 6 and 7. Referring first to FIG. 6, a Restricted Data Table 146 is shown. In general, the Table 146 is organized as a plurality of columns and rows, where each row defines a record. The columns include a type column 602, a value column 604 and an associated value column 606. The fields in each of the columns are populated during a debugging session according to the access rules 144. In one embodiment, a Restricted Data Table is created each time a record is read from the database 132. Accordingly, the values shown contained in the Table 146 are merely illustrative and will depend upon the values of the record which has been read. For illustration, it is assumed that the record 500 (shown in FIG. 5) was accessed and resulted in populating the Restricted Data Table 146. Accordingly, the Value field of the first record of the Table 146 contains "Jones" which corresponds to "Field2" of the access rules 144, the Value field of the second record contains "Enron" which corresponds to "Field3" of the access rules 144, the Value field of the third record contains "Fred" which corresponds to "Field1" of the access rules 144 and the Value field of the fourth record contains "Jones*" which corresponds to "Field6" of the access rules 144 after having been modified by the output expression.

Figures 5, 6, 7, 9:
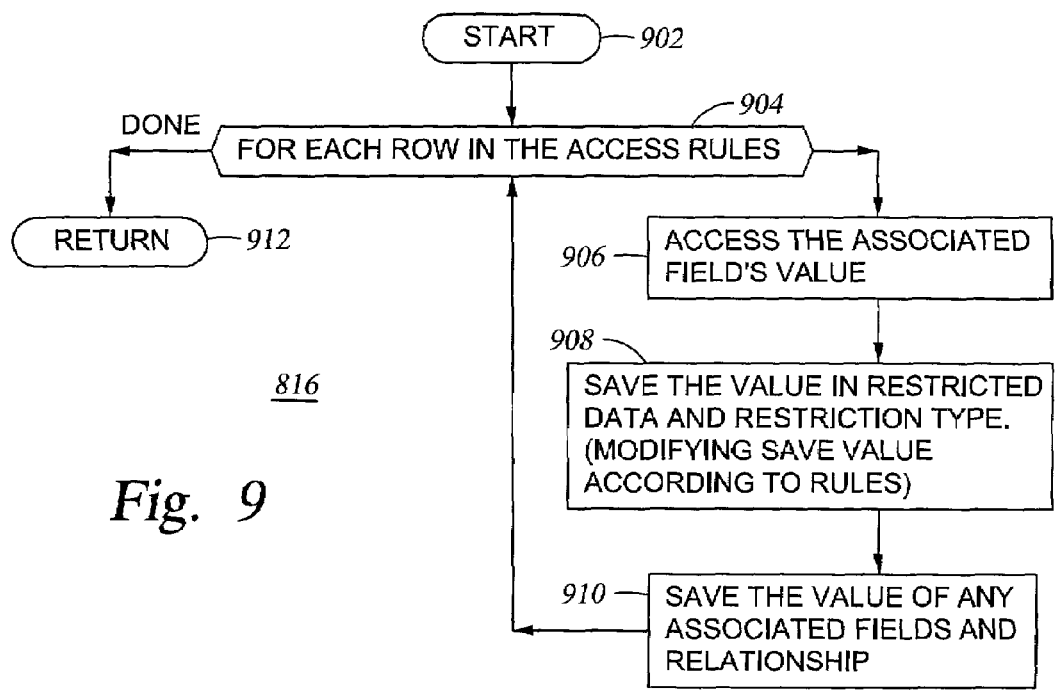
FIG. 5 is a sample database record.
FIG. 6 is illustrative embodiment of a restricted data table.
FIG. 7 in this is illustrative embodiment of an Associated Values Display Table.
FIG. 9 is one embodiment of a method illustrating maintenance of the restricted data table.

Referring now to FIG. 7, an example of the Associated Values Displayed Table 148 to shown. Illustratively, the value "Fred" is shown contained in the Table 148, indicating that "Fred" has already been displayed during a debugging session (either in the current session or a previous one, as described further below). As a result of the rule in the third record of the access rules 144, the value "Enron" will not be displayed subsequently during debugging. Further, in one embodiment, the Associated Values Displayed Table 148 will be preserved (stored) for future debugging sessions by the same user. This may be useful in preventing a user from accessing the values associated with the associated values (for conditional type restrictions) by terminating the session and then initiating a new session. In this context, a user may be a single person, a group of users or an entity. Accordingly, in one embodiment, each individual desiring to access the system 130 from the local system 110 is required to log in with a username and password. The Associated Values Displayed Table 148 created during that individual's debugging session is then associated with that user's log-in information and may be retrieved and utilized when the user (or other users of the same group were entity) logs in at a later time. The frequency with which the Associated Values Displayed Table 148 is refreshed may be user-configurable by authorized administrators of the remote system 130.

Figure 8:
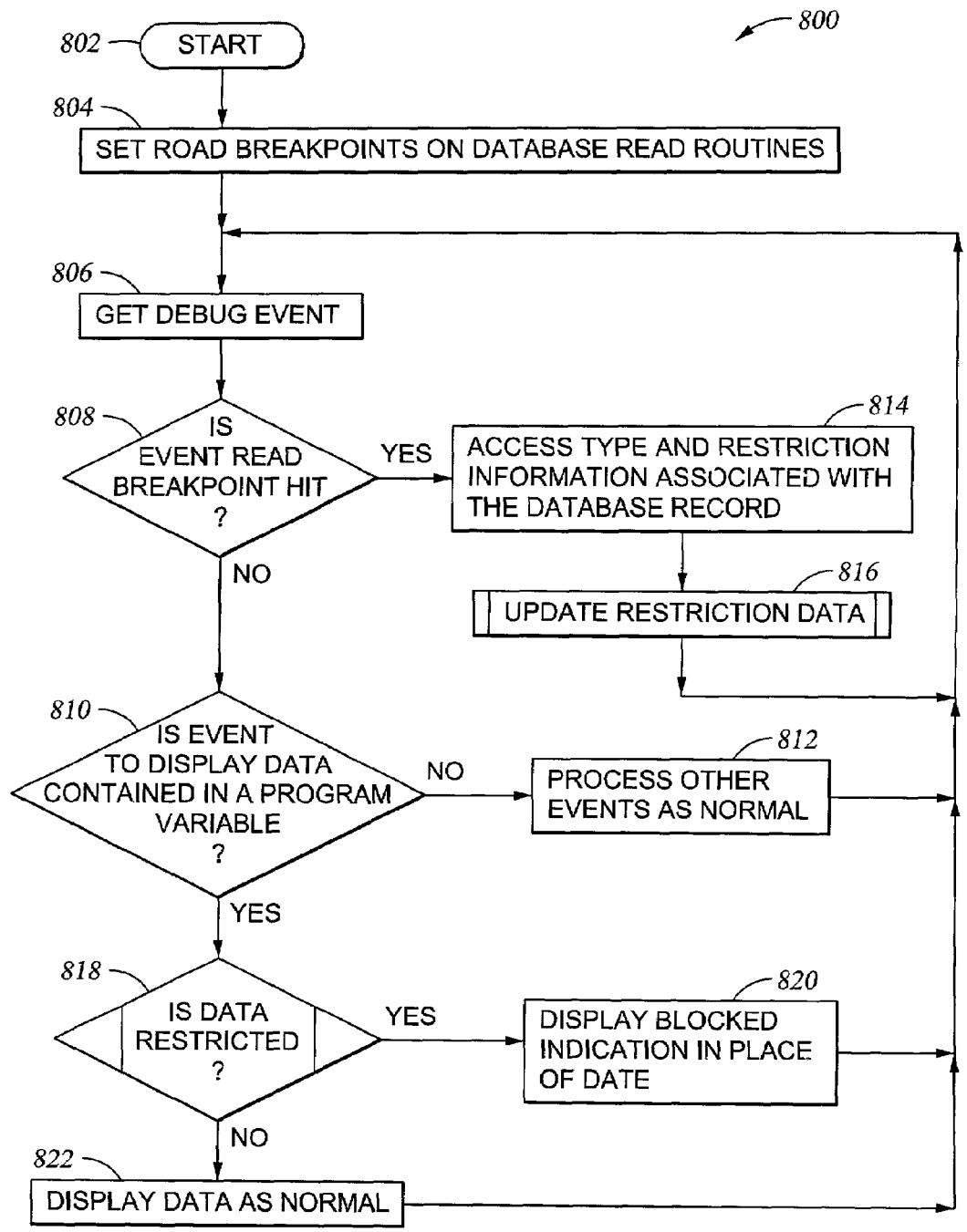
FIG. 8 is one embodiment of a method illustrating the operation of a debug engine.

Referring now to FIG. 8, a method 800 is shown illustrating a debugging session initiated from the local computer 110. The method 800 is entered at step 802 and proceeds to step 804 where breakpoints (also referred to herein as "read breakpoints") are set on read routines (which are part of the I/O routines 136) of the database management system 131. The read breakpoints are configured to fire each time data is read from the database 132 and results in the debug engine 140 being called to perform events described below. Persons skilled in the art will recognize alternative embodiments capable of achieving the same result. For example, the database management system 131 may be configured to notify the debug engine 140 in the event of a data read on the data 142 without the use of breakpoints.

Once the read breakpoints have been set, the method 800 waits for a debug event received at step 806. At step 808, the method 800 queries whether the event is the hitting of a read breakpoint. If not, processing proceeds to step 810 where the method 800 queries whether the event is to display data contained in a program variable. If step 810 is answered negatively, the event is handled at step 812 according to predefine rules.

Returning now to step 808, if the event is hitting a read breakpoint, processing proceeds to step 814. At step 814, the method 800 accesses the type and the restriction information (contained in the access rules 144) associated with the database record being read. Processing than proceeds to step 816 where the restriction data table 146 is updated. One embodiment of step 816 is described below with reference to FIG. 9. The method 800 then returns to step 806.

If step 810 is answered affirmatively, the method 800 queries, at step 818, whether the read data is restricted. If the data is not restricted, the data is displayed as normal at step 822, after which the method 800 returns to step 806. Otherwise, the data is concealed at step 820 and the method 800 then returns to step 806. It is understood that the particular manner in which the information is revealed/concealed may be varied and that the invention is not limited by a particular implementation. In one embodiment, for example, no viewable representation of concealed information is provided on an output device. In an alternative embodiment, concealed information may be identified by any variety of alphanumeric characters including, for example, asterisks, exclamation points, hyphens and the like.

Referring now to FIG. 9, one embodiment of step 816 is shown. Step 816 is entered at step 902 and then enters a loop at step 904 for each row in the access rules 144. At step 906, the value of the field indicated in the access rule record is accessed in the database record which was read. For example, in the case of the first record of the access rules 144, the value for Field2 (i.e., "Jones" in the foregoing examples) is accessed from the read database record. At step 908, a record is created in the restricted data table 146 in which the appropriate restriction type and the accessed value is saved. In saving the value at step 908, the value is modified according to any predefined rules (e.g., a parse expression and an output expression). At step 910, the value(s) of any associated field (s) is saved to the Associated Values Displayed Table 148. Processing then returns to step 904 for the next row in the access rules 144. Once each of the rows of the access rules 144 have been processed, processing returns (i.e., proceeds to step 806) at step 912.

Referring now to FIG. 10, an embodiment of step 818 is shown. Step 818 is entered at step 1002 and proceeds to step 1004 to get a value for the variable to be displayed. Step 1006 queries whether a matching value is found in the restricted data table 146 (i.e., in the Value column 604). If not, processing proceeds to step 1008 which queries whether the value is an associated value. In embodiments in which conditional type restrictions are symmetrical step 1008 will always be answered negatively if step 1006 was answered negatively because value not located in the Value column 604 of the table 146 will also not be located in the Associated Value column 606 of the table 146. Accordingly, in such embodiments, processing proceeds to step 1012 which returns a negative response (i.e., processing proceeds to step 822 where the value is displayed). However, if step 1008 is answered affirmatively, processing proceeds to step 1010 where the associated value is saved in the Associated Values Displayed table 148. Processing then proceeds to step 1012.

Returning to step 1006, if a matching value is found in the restricted data table 146, step 1004 queries whether the restriction type is Absolute. If so, step 818 returns an affirmative response at step 1016 (i.e., processing proceeds to step 820 where the value is blocked/concealed from view by a user). If the restriction type is not Absolute, then in one embodiment the restriction type is Conditional. In this case, processing proceeds from step 1014 to step 1018 where a loop is entered at step 1018 for each associated value of the value been processed. In one embodiment, the loop queries (at step 1020), for each associated value, whether the associated value is contained in the Associated Values Displayed Table 148. If so, processing proceeds to step 1016 in which case the value retrieved at step 1004 (and associated with the associated value retrieved at step 1018) is concealed from the view of a user at the local system 110. If step 1020 is answered negatively, processing returns to step 1018 for the next associated value. Once each of the associated values has been processed by the loop, processing proceeds to step 1008 to determine whether the value retrieved at step 1004 is an associated value (i.e., located anywhere in the Associated Value column 606 of the Table 146). Step 1008 will necessarily be answered affirmatively if the values are symmetric. Accordingly, each associated value will be saved in the Associated Value Displayed Table 148 (if the value has not already been saved to the Table 148).

The foregoing provides merely illustrative embodiments for concealing portions of data during a debug session. In particular, embodiments using value-based techniques are disclosed. However, persons skilled in the art will recognize other embodiments within the scope of the invention. For example, one alternative embodiment can be implemented using storage watches. The storage watches trap references to database fields that have been loaded into storage. Any time storage containing a watched field is referenced, the associated storage watch will fire. The values of such watched fields are then followed as they move through storage. For example, the debug engine 140 may examine instructions or interpret the next so many instructions (after the storage is referenced) to determine where the value is copied to, and then watches this location as well. Subsequently, when the debug engine 140 tries to reference one of these watched fields, it knows where the value came from, and therefore knows what rules to apply to the value (i.e., whether and how to display the value).

While the foregoing is directed to embodiments of the present invention, other and further embodiments of the invention may be devised without departing from the basic scope thereof, and the scope thereof is determined by the claims that follow.

What is claimed is:

1. A method of debugging executable code configured to access associated data in a data repository, comprising:
    initiating a debugging session for the executable code, and, during the debugging session:
        monitoring step-by-step execution of the executable code;
        determining whether the monitored executable code has accessed the associated data in the data repository;
        if so, determining whether to display the associated data on the basis of whether the associated data is restricted data; wherein determining whether to display the associated data comprises referencing predefined access restriction rules defining at least one rule preventing at least a portion of the associated data from being displayed to unauthorized users; and
        upon determining not to display the associated data on the basis of the referenced predefined access restriction rules, outputting masking characters on an output screen indicative of the associated data without revealing a value of the associated data, whereby selected data from the data repository is concealed from a user debugging the executable code.

2. The method of claim 1, wherein determining whether to display the associated data comprises determining whether the associated data can be provided to a debugger user interface.

3. The method of claim 1, wherein determining whether to display the associated data comprises referencing a restricted data table created in response to reading the associated data from the repository and according to the predefined access restriction rules.

4. The method of claim 1, wherein determining whether to display the associated data is performed by a debugging program.

5. The method of claim 1, wherein determining whether to display the associated data is performed by a debugging program implementing the predefined access restriction rules.

6. The method of claim 1, wherein determining whether to display the associated data comprises referencing a parse expression defining a data format and an output expression defining a restricted portion of the parse expression.

7. A computer-readable storage medium containing a debug program which, when executed, performs an operation during a debugging session initiated to debug executable code, the operation comprising:
    monitoring step-by-step execution of the executable code, wherein the executable code is configured to access associated data in a repository;
    determining whether the monitored executable code has accessed the associated data in the repository;
    upon determining that the monitored executable code has accessed the associated data in the repository, determining whether to display the associated data on the basis of whether the associated data is restricted data; wherein determining whether to display the associated data comprises referencing predefined access restriction rules defining at least one rule preventing at least a portion of the associated data from being displayed to unauthorized users; and
    upon determining not to display the associated data on the basis of the referenced predefined access restriction rules, outputting masking characters on an output screen indicative of the associated data without revealing a value of the associated data, whereby selected data from the data repository is concealed from a user debugging the executable code.

8. The computer-readable storage medium of claim 7, wherein determining whether the associated data can be displayed comprises determining whether the associated data can be provided to a debugger user interface.

9. The computer-readable storage medium of claim 7, further comprising:
    determining that the associated data cannot be displayed; and
    outputting text characters on an output screen indicative of the associated data without revealing a value of the associated data.

10. The computer-readable storage medium of claim 7, wherein determining whether the associated data can be displayed comprises referencing a restricted data table created in response to reading the associated data from the repository and according to the predefined access restriction rules.

11. The computer-readable storage medium of claim 7, wherein determining whether the associated data can be displayed comprises referencing a parse expression defining a data format and an output expression defining a restricted portion of the parse expression.

12. The computer-readable storage medium of claim 7, wherein the executable code accesses the associated data comprising a record and wherein determining whether the associated data can be displayed comprises:
    referencing the predefined access restriction rules defining at least one rule preventing at least one field value from being displayed; and
    determining whether the record contains the at least one field value.

13. A computer-readable storage medium containing a debug program which, when executed, performs an operation of debugging executable code configured to access associated data in a repository, the debug program comprising:
    a debugger user interface; and
    a debug engine configured to:
        initiate a debugging session for the executable code, and during the debugging session:
            monitor step-by-step execution of the executable code;
            determine whether the monitored executable code has accessed the associated data in the data repository;
            upon determining that the monitored executable code has accessed the associated data in the data repository, determine determining whether to display the associated data on the basis of whether the associated data is restricted data; wherein determining whether to display the associated data comprises referencing predefined access restriction rules defining at least one rule preventing at least a portion of the associated data from being displayed to unauthorized users; and
            upon determining not to display the associated data on the basis of the referenced predefined access restriction rules, output masking characters on an output screen indicative of the associated data without revealing a value of the associated data, whereby selected data from the data repository is concealed from a user debugging the executable code.

14. The computer-readable storage medium of claim 13, wherein the debug engine is configured to:
    determine that the associated data cannot be displayed during the debugging session; and conceal the display of the associated data by displaying text characters on an output screen indicative of the associated data without revealing a value of the associated data.

15. The computer-readable storage medium of claim 13, wherein the debug engine is configured to selectively pass data to the debugger user interface by referencing a restricted data table created in response to reading the associated data from the repository and according to the predefined access restriction rules.

16. The computer-readable storage medium of claim 13, wherein the at least one rule defines a value and an associated value, wherein if the associated value has been displayed the debug engine will not provide the value to the debugger user interface for display.

17. The computer-readable storage medium of claim 13, wherein the at least one rule defines a parse expression defining a data format and an output expression defining a restricted portion of the parse expression, whereby all values having restricted portion will not be provided to the debugger user interface for display.

* * * * *